United States Patent
Cheng et al.

(10) Patent No.: US 6,810,263 B1
(45) Date of Patent: Oct. 26, 2004

(54) PACKET DATA RECONNECTION TIMING CONTROL IN MOBILE COMMUNICATION SYSTEMS

(75) Inventors: Mark W. Cheng, Carlsbad, CA (US); Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/470,285

(22) Filed: Dec. 22, 1999

(51) Int. Cl.[7] .............................................. H04Q 7/20
(52) U.S. Cl. ...................... 455/510; 455/517; 370/230
(58) Field of Search ................................. 455/509, 570, 455/576, 450, 455, 464, 422, 417, 517, 414, 414.1; 370/442, 445, 448, 424, 418, 462, 230, 328

(56) References Cited

U.S. PATENT DOCUMENTS

| | | | |
|---|---|---|---|
| 3,878,512 A | | 4/1975 | Kobayashi et al. |
| 4,409,592 A | | 10/1983 | Hunt |
| 4,506,361 A | | 3/1985 | Kume |
| 5,012,510 A | | 4/1991 | Schaubs et al. |
| 5,157,716 A | | 10/1992 | Naddor et al. |
| 5,274,837 A | * | 12/1993 | Childress et al. ............ 370/344 |
| 5,353,287 A | * | 10/1994 | Kuddes et al. .............. 370/448 |
| 5,355,516 A | * | 10/1994 | Herold et al. ................ 455/450 |
| 5,434,847 A | | 7/1995 | Kou |
| 5,434,861 A | * | 7/1995 | Pritty et al. ................. 370/449 |
| 5,436,903 A | * | 7/1995 | Yang et al. .................. 370/448 |
| 5,544,224 A | * | 8/1996 | Jonsson et al. .............. 455/434 |
| 5,696,760 A | * | 12/1997 | Hardin et al. ................ 370/252 |
| 5,699,515 A | | 12/1997 | Berkema et al. |
| 5,710,547 A | * | 1/1998 | Ayerst et al. ............... 340/7.22 |
| 5,842,125 A | | 11/1998 | Modzelesky et al. |
| 5,862,488 A | * | 1/1999 | Kotzin et al. ................ 455/510 |
| 5,896,567 A | * | 4/1999 | Ogushi ........................ 455/421 |
| 5,943,334 A | * | 8/1999 | Buskens et al. ............. 370/328 |
| 5,963,559 A | | 10/1999 | Ohki |
| 6,032,040 A | | 2/2000 | Choy et al. |
| 6,061,559 A | * | 5/2000 | Eriksson et al. ............ 455/414 |
| 6,075,779 A | * | 6/2000 | Agarwal et al. ............. 370/337 |
| 6,205,153 B1 | * | 3/2001 | Shaffer et al. ............... 370/445 |
| 6,215,782 B1 | * | 4/2001 | Buskens et al. ............. 370/350 |
| 6,240,284 B1 | | 5/2001 | Bugnon et al. |
| 6,246,872 B1 | | 6/2001 | Lee et al. |
| 6,275,713 B1 | | 8/2001 | Toda |
| 6,333,937 B1 | * | 12/2001 | Ryan ........................... 370/468 |
| 6,343,216 B1 | * | 1/2002 | Kim et al. ................... 455/414 |
| 6,501,947 B1 | * | 12/2002 | Hunzinger et al. ......... 455/414.1 |

* cited by examiner

Primary Examiner—Charles Appiah
(74) Attorney, Agent, or Firm—Harness, Dickey & Pierce, PLC

(57) ABSTRACT

The present invention is a system for distributing the reconnection attempts of multiple system users in a CDMA telephone system over a broad time window. The invention assigns a randomly initial wait time for each system user from a time window. After the initial wait time is assigned to a system user, any unsuccessful reconnection attempt by that user results in quadrupling the current wait time, until a maximum wait time window is reached. Once the maximum time window is reached, the system user continues to attempt reconnection every cycle of the maximum wait time until connection is maintained. By randomly assigning an initial wait time to each system user, the probability of system users attempting simultaneous reconnection is reduced, thus reducing the likelihood of reconnection collision.

22 Claims, 4 Drawing Sheets

PACKET DATA RECONNECTION TIMING CONTROL IN MOBILE COMMUNICATION SYSTEMS

BACKGROUND OF THE INVENTION

The use of wireless communication systems is growing with users now numbering well into the millions. One of the popular wireless communications systems is the cellular telephone, having a mobile station (or handset) and a base station. Cellular telephones allow a user to talk over the telephone without having to remain in a fixed location. This allows users to, for example, move freely about the community while talking on the phone.

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically the system operates with a lower level of interference and dynamic channel conditions.

A CDMA base station communicates with a mobile station with a signal having a basic data rate of 9600 bits/s. The signal is then spread to a transmitted bit rate, or chip rate, of 1.2288 MHz. Spreading applies digital codes to the data bits, which increase the data rate while adding redundancy to the CDMA system. The chips of all the users in that cell are then added to form a composite digital signal. The composite digital signal is then transmitted using a form of quadrature phase shift keying (QPSK) modulation that has been filtered to limit the bandwidth of the signal.

In a code division multiple access (CDMA) spread spectrum communication system, a common frequency band is used for communication with all base stations within that system. If two or more mobile users simultaneously contend for an idle packet-data channel in a system using IS-707, the system will only allow one access to the channel. Mobile users unsuccessful at accessing the channel must repeat the transmission of the data packet until it is accepted by the system. The system users transmitting data packets to mobile users also contend for the downlink by being placed in a queue.

Under the current IS-707 standard, when a system user is unable to access the channel, the system user reattempts connection after a predetermined wait. The length of the wait is defined by the IS-707 standard, and is the same for each system user. After each subsequent unsuccessful attempt to connect to the system, the length of the wait is increased until a maximum value is reached. However, if the system users were denied access to an idle channel because multiple users attempted to simultaneously access the channel, each user will attempt to re-access the channel at the same time, causing further collisions.

What is needed is a system that allows the system users to wait for a free channel to connect to the system while reducing the probability of reconnection collision with other system users.

SUMMARY OF THE INVENTION

The present invention distributes the reconnection attempts by the system users over a broad time window. The present invention randomly assigns an initial wait time for each system user from a time window. After the initial wait time is assigned to a system user, any unsuccessful reconnection attempt by that user results in quadrupling the current wait time, until a maximum wait time window is reached. Once the maximum time window is reached, the system user continues to attempt reconnection every cycle of the maximum wait time until connection is maintained. By randomly assigning an initial wait time to each system user, the probability of system users attempting simultaneous reconnection is reduced, thus reducing the likelihood of reconnection collision.

One aspect of the invention is a method of varying the length of time between connection attempts by a mobile station in a wireless communication system. The method comprises initializing a reconnection timer to a set value and waiting for the reconnection timer to time out. After time out, the mobile station attempts to connect to the wireless communication system. If the connection attempt fails, the mobile station resets the timer to a value in a predetermined range. The predetermined range is approximately four times the set value. After the reconnection timer is set, the method may further comprise waiting for the reconnection timer to again time out and attempting to reconnect to the wireless communication system. If the reconnection attempt fails, the mobile station determines if the reconnection timer is at a maximum allowable value. If not at a maximum value, the value of the reconnection timer is increased.

Another aspect of the invention is a mobile station for use in a mobile communication system. The mobile station comprises a reconnection timer and a timer setting circuit. The timer setting circuit sets the reconnection timer to a value within a predetermined range after a failed connection attempt between the mobile station and the mobile communication system. The timer setting circuit also increases the value of the reconnection timer after any subsequent failed connection attempts until a maximum value is reached. The value of the reconnection timer may be increased by quadrupling the previous value.

BRIEF DESCRIPTION OF THE DRAWINGS

These and other features and advantages of the invention will become more apparent upon reading the following detailed description and upon reference to the accompanying drawings.

DESCRIPTION OF THE PREFERRED EMBODIMENTS

Figure 1:
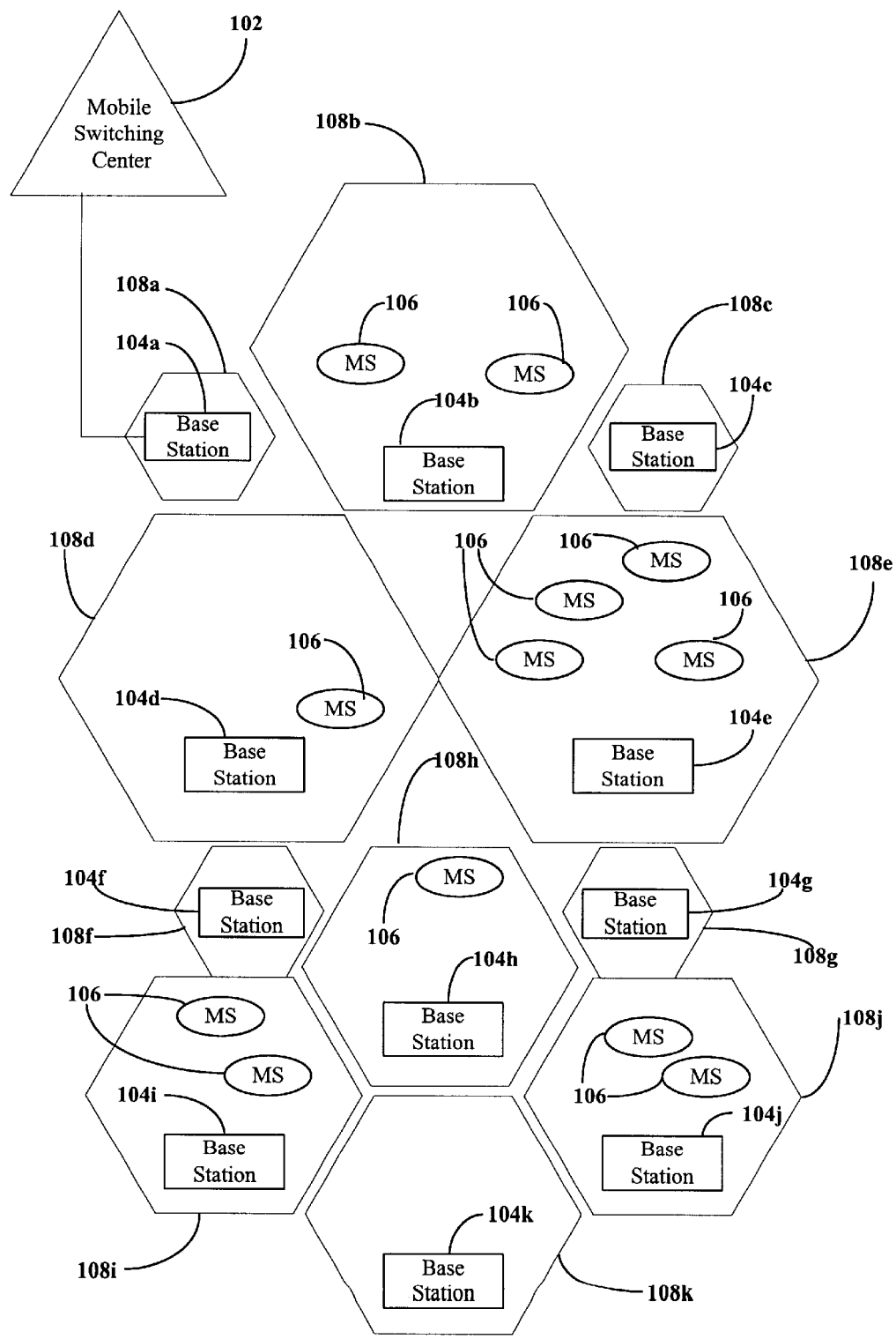
FIG. 1 illustrates the components of an exemplary wireless communication system used by the present invention.

FIG. 1 illustrates components of an exemplary wireless communication system. A mobile switching center 102 communicates with base stations 104a–104k (only one connection shown). The base stations 104a–104k (generally 104) broadcasts data to and receives data from mobile stations 106 within cells 108a–108k (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile station identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

When attempting to place a call, the mobile station 106 sends a connection request to the base station 104. If a traffic channel is available, the mobile station 106 connects to the base station and transmits the call information along the traffic channel. However, if no traffic channel is available, the mobile station 106 waits a predetermined amount of time and then attempts to reconnect.

Figure 2:
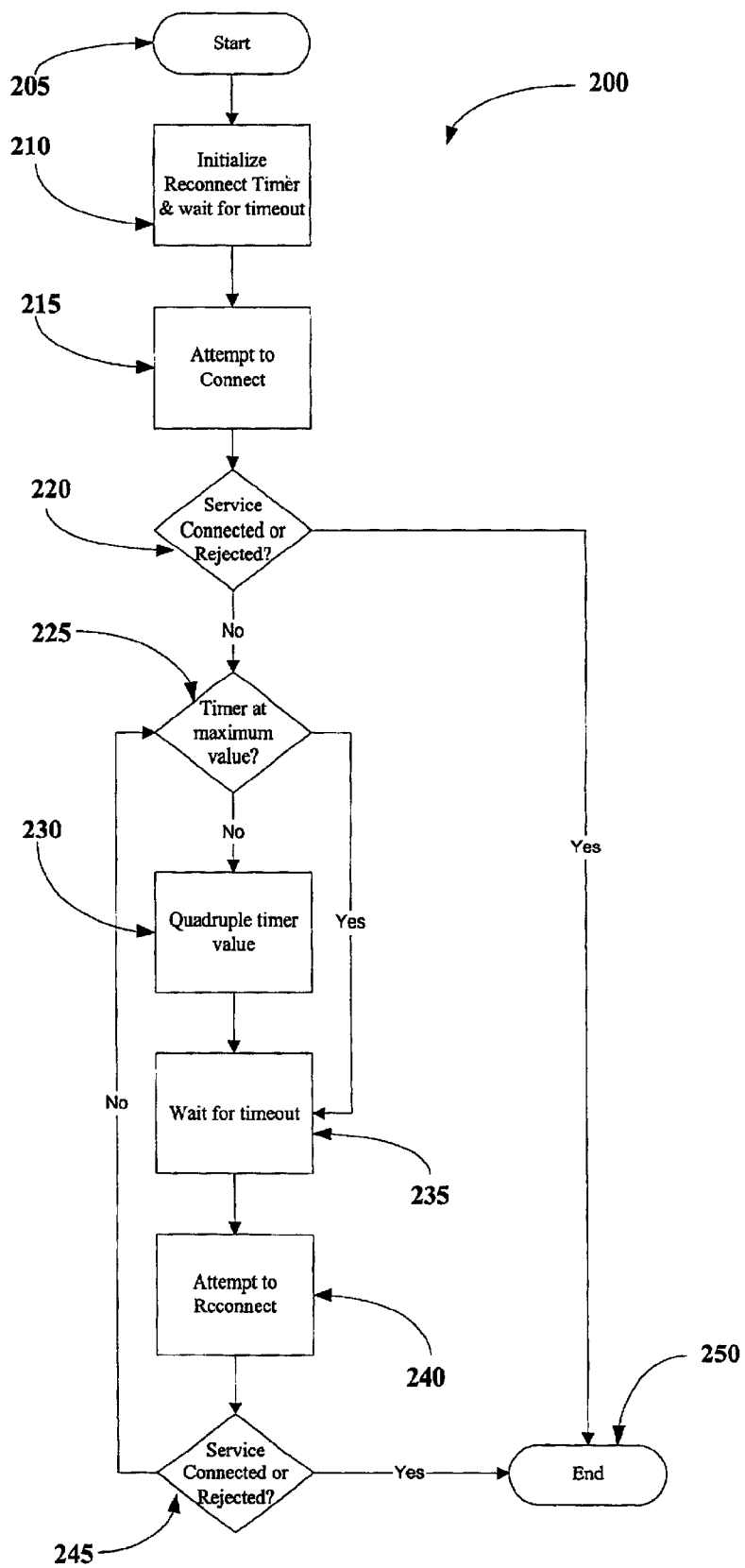
FIG. 2 is a flowchart illustrating the reconnection timer procedure according to the existing standard.

FIG. 2 illustrates the process 200 used by a mobile station 106 under the current CDMA standard after an initial attempt to connect has failed. The process 200 begins at a start state 205 Proceeding to state 210 the mobile station 106 initializes a reconnect timer and waits for the time out. Under the IS-707 standard, the timer is initialized at approximately four seconds. After the timer has elapsed, the process 200 proceeds to state 215 and again attempts to connect to the base station 104.

Proceeding to state 220, the mobile station 106 determines whether service with the base station 104 has been connected or rejected, or if the mobile station 106 was unable to communicate with the base station 104. If the connection with the base station 104 is successful, the mobile station 106 proceeds along the YES branch and the connection process terminates in end state 250. Returning to state 220, if the connection with the base station 104 is unsuccessful, the mobile station 106 proceeds along the NO branch to state 225 where the mobile station 106 determines whether the timer is at the maximum allowable value.

If the timer is at the maximum value, the mobile station 106 proceeds along the YES branch to state 235, where the mobile station waits for the timer to time out. Returning to state 220, if the time is not at the maximum value, the mobile station 106 proceeds along the NO branch to state 230, where the value of the time is quadrupled. After quadrupling the timer value, the mobile station proceeds to state 235 to wait for the timer to time out.

After the timer expires in state 235 the mobile station 106 proceeds to state 240 and attempts to reconnect to the base station 104. If the connection with the base station 104 is successful, the mobile station 106 proceeds along the YES branch and the connection process terminates in end state 250. Returning to state 245, if the connection with the base station 104 is unsuccessful, the mobile station 106 proceeds along the NO branch to state 225 where the mobile station 106 again determines whether the timer is at the maximum allowable value. Every time the mobile station 106 unsuccessfully attempts connection with the base station 104, the mobile station 106 quadruples the wait timer until a maximum value is met. After time out of the wait timer, the mobile station reattempts connection with the base station 104.

An example of a series of mobile stations 106 attempting to communicate with the base station 104 according to the existing IS-95 standard will now be described. One scenario in which reconnection collision is likely is when multiple mobile stations 106 attempt to communicate with the base station at approximately the same time. This may occur, for example, after the base station 104 broadcasts an alert message to all the mobile stations 106. Other examples may be when the mobile stations 106 are programmed to communicate with the base station 104 at a predetermined time or after a predetermined event. For example, if ten mobile stations 106 simultaneously attempt to connect to one available channel of the base station 104 only one of the mobile stations 106 can successfully connect. The other nine mobile stations 106 then initialize their respective reconnection timers at four seconds. Because each of the mobile stations 106 initialize the reconnection timers at approximately the same time, the timers will time out at approximately the same time. Thus, all nine of the mobile stations 106 attempt to reconnect at the same time, causing further reconnection collision. At this time, the mobile stations 106 quadruple the value of the reconnection timers. However, because each timer is set for four seconds, after quadrupling, each timer is set for sixteen seconds. Once again, the reconnection timers time out at approximately the same time and all of the mobile stations 106 again attempt to reconnect at the same time. This process repeats and the reconnection timer value quadruples to 64 seconds. However, time out of each of the mobile stations 106 occurs at the same time, and the mobile stations 106 again attempt to simultaneously reconnect to the base station 104 thereby causing further reconnection collision. Meanwhile, during the 64 seconds the timer is counting, it is possible the base station 104 is available. This process repeats, quadrupling the reconnection timer until a maximum value is reached (approximately 4096 seconds)

and until all the mobile stations 106 eventually communicate with the base station 104.

The present invention, designed to be used with cdma2000, or IS-2000, spreads the reconnection attempts by the mobile stations 106 more evenly in an effort to reduce reconnect collision. The spread is achieved by introducing a random component into the reconnect delay timer calculation. By adding the random component, the mobile stations 106 use the available traffic channels more efficiently. The random component is limited in value so the expected value of the delay remains the same as or close to the previous standard delay. Maintaining the expected delay close to the previous standard delay ensures backwards compatibility with previous systems such as IS-95 or IS-707.

In the present invention, the mobile station 106 maintains an initial delay value of 4 seconds. However, after an initial reconnection collision, the reconnection delay is not quadrupled, but assigned a random value from within a predetermined range. In one embodiment, the predetermined range is from 7 seconds to 27 seconds. This range is selected to provide a broader spectrum of reconnect times for the mobile station 106, but maintaining an average reconnect time similar to the previous standard (16 seconds). For any additional attempts, the mobile station 106 quadruples the random value to achieve a new reconnection timer value until the maximum allowable value is met. Of course, although the range of 7 seconds to 27 seconds is disclosed, other ranges may be used without departing from the spirit of the invention.

Figure 3:
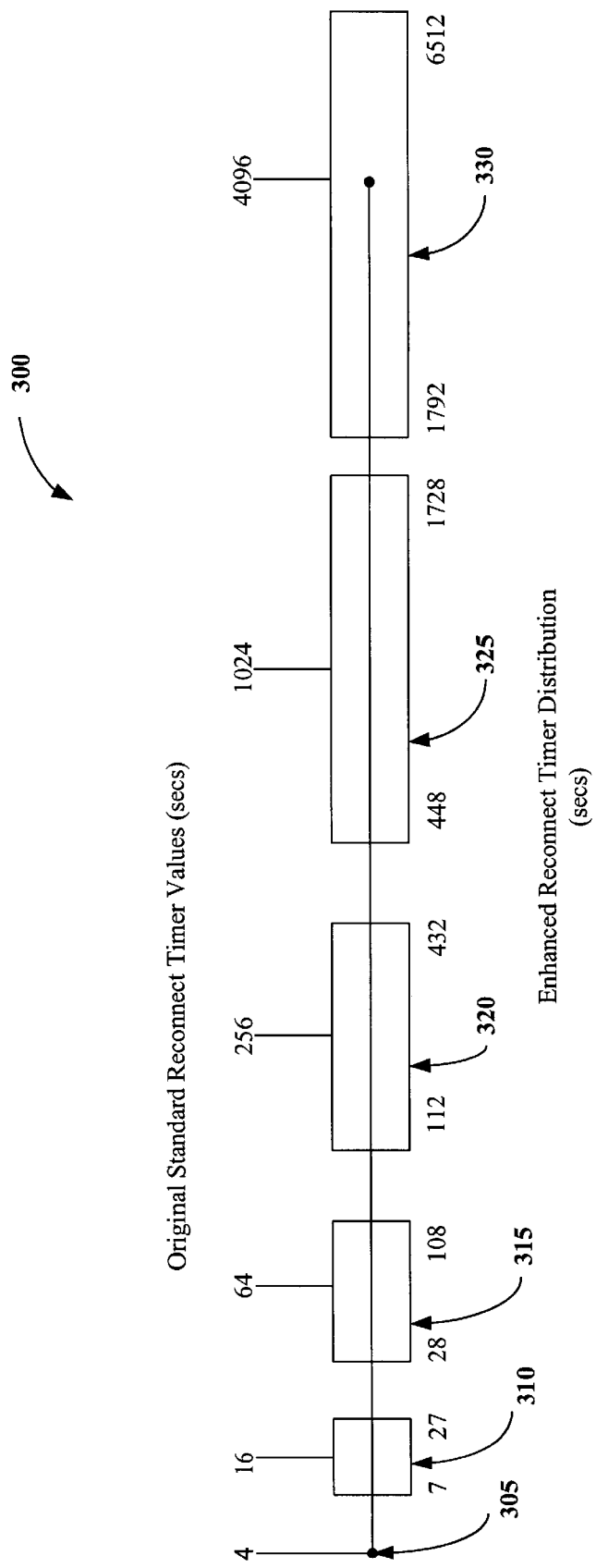
FIG. 3 is a graphical representation of the distribution of the Reconnect Timer Values using the procedure according to the present invention.

The reconnect timer distributions 300 of the mobile stations 106 according to the present invention and the prior standard are shown in FIG. 3. As shown, the prior standard begins with a reconnect timer value of 4 seconds, which is quadrupled to 16 seconds, which is quadrupled to 64 seconds, which is quadrupled to 256 seconds, which is quadrupled to 1024 seconds, which is quadrupled to the maximum value of 4096 seconds. In contrast, the possible values of the reconnect timer value according to the present invention are distributed within timing groups 310, 315, 320, 325, and 330. The present invention begins with a reconnect timer value of 4 seconds. If a connection is not achieved, the mobile station 106 generates a new reconnection timer value within the timing group 310. The timing group 310 ranges from 7 seconds to 27 seconds. As FIG. 3 graphically illustrates, the prior standard value of 16 seconds (4 seconds quadrupled) falls approximately in the middle of the timing group 310. Thus, a plurality of mobile stations 106 can attempt reconnection within the timing group 310 and have a high level of success, because not all of the plurality of mobile stations attempt reconnection at precisely 16 seconds. By choosing a timing group range around the previously set value (16 seconds), the present invention causes a reconnection attempt around the expected time and therefore maintains backwards compatibility.

If reconnection is not successful after the mobile station 106 generates a new reconnection timer value within the timing group 310, the selected value is then quadrupled to achieve a new reconnection timer value in the timing group 315. The timing group 315 spans the values of 28 seconds (7 seconds quadrupled) to 108 seconds (27 seconds quadrupled). If reconnection is still not successful, the new value is then quadrupled to achieve a new reconnection timer value in the timing group 320. The timing group 320 spans the values of 112 seconds (28 seconds quadrupled) to 432 seconds (108 seconds quadrupled). If reconnection is still not successful, the reconnection timer value quadrupled again to achieve a new reconnection timer value in the timing group 325. The timing group 325 spans the values of 448 seconds (112 seconds quadrupled) to 1728 seconds (432 seconds quadrupled). If reconnection is still not successful, the value is again quadrupled to achieve a new reconnection timer value in the timing group 330. The timing group 330 spans the values of 1792 seconds (448 seconds quadrupled) to 6512 seconds (1728 seconds quadrupled). However, the any value above the maximum allowed (currently 4096 seconds) is automatically reduced to the maximum value. Any further unsuccessful connection attempt raises the reconnection timer value to the maximum value. As FIG. 3 graphically illustrates, the prior standard values of 64 seconds, 256 seconds, 1024 seconds, and 4096 seconds fall approximately in the middle of the timing groups 315, 320, 325, and 330, respectively.

Figure 4:
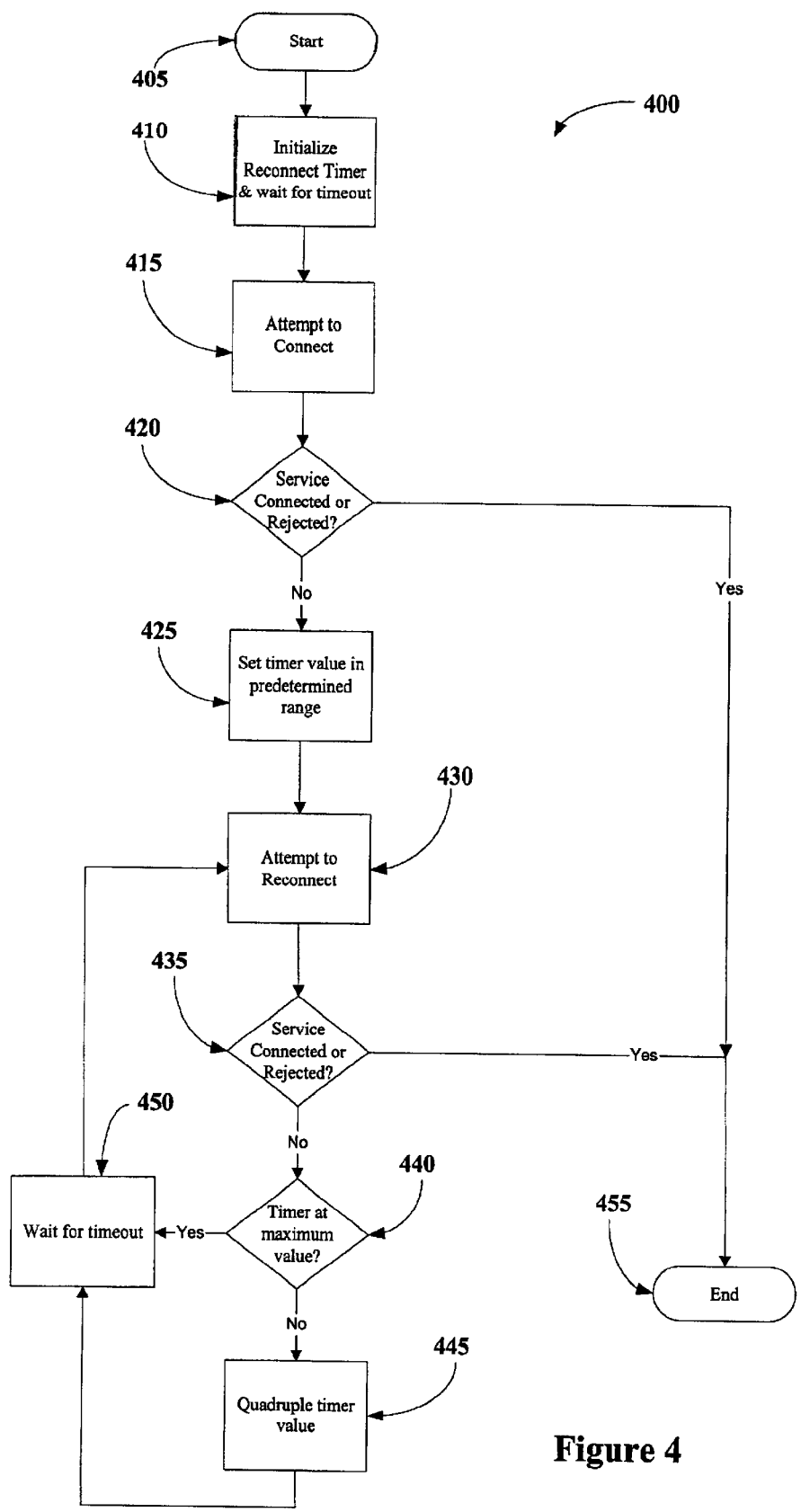
FIG. 4 is a flowchart illustrating the reconnection timer procedure according to the present invention.

FIG. 4 illustrates the process 400 used by a mobile station 106 according to the present invention after an initial attempt to connect to the base station 104 has failed. The process 400 begins at a start state 405. Proceeding to state 410, the mobile station 106 initializes a reconnect timer and waits for the time out. In one embodiment of the invention, the timer is initialized at approximately four seconds. After the timer has elapsed, the process 400 proceeds to state 415 and again attempts to connect to the base station 104.

Proceeding to state 420, the mobile station 106 determines whether service with the base station 104 has been connected or rejected, or if the mobile station 106 was unable to connect with the base station 104. If the connection with the base station 104 is successful, the mobile station 106 proceeds along the YES branch and the connection process terminates in end state 455 Returning to state 420 if the connection with the base station 104 is unsuccessful, the mobile station 106 proceeds along the NO branch to state 425 where the mobile station 106 assigns the reconnect timer a value in a predetermined range. As stated above, according to one embodiment of the invention, the range is from 7 seconds to 27 seconds.

After the timer expires in state 425, the mobile station 106 proceeds to state 430 and attempts to reconnect to the base station 104. If the connection with the base station 104 is successful, the mobile station 106 proceeds along the YES branch and the connection process terminates in end state 455 Returning to state 435, if the connection with the base station 104 is unsuccessful, the mobile station 106 proceeds along the NO branch to state 440 where the mobile station 106 determines whether the timer is at the maximum allowable value. If the timer is at the maximum value, the mobile station 106 proceeds along the YES branch to state 450, where the mobile station waits for the timer to time out. Returning to state 440, if the timer is not at the maximum value, the mobile station 106 proceeds along the NO branch to state 445, where the value of the timer is quadrupled. After quadrupling the timer value, the mobile station proceeds to state 450 to wait for the timer to time out.

After the timer expires in state 450, the mobile station 106 proceeds to state 430 and attempts to reconnect to the base station 104. If the connection with the base station 104 is successful, the mobile station 106 proceeds along the YES branch and the connection process terminates in end state 455. Returning to state 435, if the connection with the base station 104 is unsuccessful, the mobile station 106 proceeds along the NO branch to state 440 where the mobile station 106 again determines whether the timer is at the maximum allowable value. Every time the mobile station 106 unsuccessfully attempts connection with the base station 104 the mobile station 106 quadruples the wait timer until a maximum value is met. After time out of the wait timer, the mobile station reattempts connection with the base station 104.

Multiple simulations were performed to compare the procedure of the present invention with the previous standard. The simulation scenarios used 150 mobile stations 106 and 10 available resources of a 1-hour period. The first simulation consisted of initial connections with a random duration of 30 to 70 seconds randomly distributed over a 1-hour period. Each mobile station 106 then attempted reconnection after 1 to 3 minutes. The results of the first simulation indicate no significant change in channel utilization and the rejection rate when the mobile stations 106 are randomly accessing the base station 104. The results are summarized in Table 1.

TABLE 1

Utilization and Connection in Random Access

|  | Existing Procedure | Present Invention |
|---|---|---|
| Channel Utilization | 86% | 86% |
| Connections and Reconnections Rejected | 64% | 63% |

The second simulation consisted of simultaneous connections with durations of 30 seconds to 70 seconds over a 1-hour period. After an initial successful connection, each mobile station 106 attempted reconnection after 1 to 3 minutes. The results of the second simulation demonstrate a significant increase in channel utilization and corresponding decrease in the rejection rate when the mobile stations 106 are simultaneously accessing the base station 104 using the procedure of the present invention. The results are summarized in Table 2.

TABLE 2

Utilization and Connection during Simultaneous Connection

|  | Existing Procedure | Present Invention |
|---|---|---|
| Channel Utilization | 54% | 19% |
| Connections and Reconnections Rejected | 95% | 47% |

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of varying the length of time between connection attempts between a mobile station and a base station in a wireless communication system comprising:
    randomly determining a first reconnection timer value, such that the first reconnection timer value falls within a predetermined range of values;
    setting a reconnection timer to the first reconnection time value;
    waiting for the reconnection timer to time out;
    attempting to connect to the wireless communication system; and
    resetting the reconnection timer to a second reconnection timer value when the attempt to connect fails, wherein the second reconnection timer value is determined by multiplying the first reconnection timer value by a fixed number.

2. The method of claim 1, wherein the predetermined range is approximately 7 seconds to 27 seconds.

3. The method of claim 1, further comprising:
    determining if the reconnection timer is at a maximum allowable value if subsequent reconnection attempts fail; and
    limiting a value of the reconnection timer to the maximum allowable value.

4. The method of claim 3, wherein the maximum allowable value is 4096 seconds.

5. The method of claim 1, wherein the fixed number is 4.

6. The method of claim 1, further comprising limiting the randomization of the first reconnection timer value to have an expected value equal to the delay of another reconnection protocol.

7. The method of claim 6, wherein another reconnection method is a previously used reconnection protocol.

8. The method of claim 1, wherein the first reconnection timer value has an expected value equal to the expected value of a reconnection delay of a previous protocol.

9. The method of claim 1, wherein the second reconnection timer value is within a range of expected reconnection delay of another reconnection method.

10. The method of claim 1, wherein the a deterministic computation of the second reconnection timer value ensures backward compatibility with a prior communication system.

11. A mobile station for use in a mobile communication system comprising:
    a reconnection timer; and
    a timer setting circuit which sets the reconnection timer to a random value within a predetermined range after a failed connection attempt between the mobile station and the mobile communication system, wherein the timer setting circuit resets the value of the reconnection timer after subsequent failed connection attempts by determining a value that is deterministic based on the random value and less than a maximum value.

12. The mobile station of claim 11, wherein an average value of the predetermined range is approximately four times an initial value.

13. The mobile station of claim 12, wherein the initial value is approximately 4 seconds.

14. The mobile station of claim 13, wherein the predetermined range is approximately 7 seconds to 27 seconds.

15. The mobile station of claim 11, wherein the deterministic value of the reconnection timer is obtained by quadrupling the previous value.

16. The mobile station of claim 11, wherein the maximum value is 4096 seconds.

17. The mobile station of claim 11, wherein the timer setting circuit further limits the randomization of the first reconnection timer value to have an expected value equal to the delay of another reconnection protocol.

18. The mobile station of claim 11, wherein the random value has an expected value equal to the expected value of a reconnection delay of a previous protocol.

19. The mobile station of claim 11, wherein the value of the reconnection timer after subsequent failed connection attempts is within a range of expected reconnection delay of another reconnection method.

20. The mobile station of claim 19, wherein another reconnection method is a previously used reconnection protocol.

21. The mobile station of claim 11, wherein the deterministic computation based on the random value ensures backward compatibility with a prior communication system.

22. The mobile station of claim 21, wherein determining a value that is deterministic based on the random value comprises multiplying the previous reconnection timer value by a fixed number to generate a new reconnection timer value until a maximum value is reached.

* * * * *